(12) United States Patent
Niu

(10) Patent No.: US 8,483,959 B2
(45) Date of Patent: Jul. 9, 2013

(54) NAVIGATION SYSTEM WITH LOCATION ADAPTATION AND METHOD OF OPERATION THEREOF

(75) Inventor: Xiaochuan Niu, Cupertino, CA (US)

(73) Assignee: Telenav, Inc., Sunnyvale, CA (US)

( * ) Notice: Subject to any disclaimer, the term of this patent is extended or adjusted under 35 U.S.C. 154(b) by 350 days.

(21) Appl. No.: 12/986,169

(22) Filed: Jan. 6, 2011

(65) Prior Publication Data

US 2012/0179367 A1    Jul. 12, 2012

(51) Int. Cl.
*G01C 21/34* (2006.01)
*G01C 21/36* (2006.01)

(52) U.S. Cl.
USPC ............ 701/450; 701/446; 701/424; 701/411

(58) Field of Classification Search
USPC .......................................................... 701/446
See application file for complete search history.

(56) References Cited

U.S. PATENT DOCUMENTS

| | | | |
|---|---|---|---|
| 6,381,537 B1 | 4/2002 | Chenault et al. | |
| 6,853,905 B2 | 2/2005 | Barton | |
| 2004/0036622 A1* | 2/2004 | Dukach et al. | 340/691.6 |
| 2005/0004754 A1* | 1/2005 | Hayes | 701/209 |
| 2007/0287473 A1* | 12/2007 | Dupray | 455/456.1 |
| 2008/0004794 A1* | 1/2008 | Horvitz | 701/200 |
| 2008/0040026 A1* | 2/2008 | Hui | 701/201 |
| 2008/0189640 A1 | 8/2008 | Winberry et al. | |
| 2008/0272933 A1* | 11/2008 | Cahill-O'Brien et al. | 340/870.02 |
| 2009/0005987 A1* | 1/2009 | Vengroff et al. | 701/300 |
| 2009/0177383 A1* | 7/2009 | Tertoolen | 701/208 |
| 2010/0014712 A1 | 1/2010 | Sampedro Diaz et al. | |
| 2010/0131199 A1* | 5/2010 | Severson | 701/213 |
| 2010/0184453 A1* | 7/2010 | Ohki | 455/456.3 |
| 2010/0185388 A1* | 7/2010 | Horvitz | 701/204 |

\* cited by examiner

*Primary Examiner* — Shelley Chen

(57) ABSTRACT

A method of operation of a navigation system includes: receiving a request for a destination; establishing a predetermined time period based on the destination; calculating a user generated address associated with the destination and filtered with the predetermined time period; generating a comparison between a destination address of the destination and the user generated address; and generating a travel route to the user generated address for the destination with the comparison as the non-match for displaying on a device.

20 Claims, 6 Drawing Sheets

NAVIGATION SYSTEM WITH LOCATION ADAPTATION AND METHOD OF OPERATION THEREOF

TECHNICAL FIELD

The present invention relates generally to a navigation system, and more particularly to a system with location adaptation.

BACKGROUND ART

Modern portable consumer and industrial electronics, especially client devices such as navigation systems, cellular phones, portable digital assistants, and combination devices, are providing increasing levels of functionality to support modern life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide navigation services such as a global positioning system (GPS) for a car or on a mobile device such as a cell phone, portable navigation device (PND) or a personal digital assistant (PDA).

Location based services allow users to create, transfer, store, and/or consume information in order for users to create, transfer, store, and consume in the "real world". One such use of location based services is to efficiently transfer or route users to the desired destination or service.

Navigation systems and location based services enabled systems have been incorporated in automobiles, notebooks, handheld devices, and other portable products. Today, these systems aid users by incorporating available, real-time relevant information, such as maps, directions, local businesses, or other points of interest (POI). The real-time information provides invaluable relevant information.

However, guidance to an incorrect destination has become a paramount concern for the consumer. Guidance to a destination not most optimal for the user by the navigation system decreases the benefit of using the tool.

Thus, a need still remains for a navigation system with location adaptation based destination guidance mechanism to generate a route to a destination most optimal to the user. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a request for a destination; establishing a predetermined time period based on the destination; calculating a user generated address associated with the destination and filtered with the predetermined time period; generating a comparison between a destination address of the destination and the user generated address; and generating a travel route to the user generated address for the destination with the comparison as the non-match for displaying on a device.

The present invention provides a navigation system, including: a request receiver module for receiving a request for a destination; a time threshold module, coupled to the request receiver module, for establishing a predetermined time period based on the destination; an address calculation module, coupled to the time threshold module, for calculating a user generated address associated with the destination and filtered with the predetermined time period; an address comparison module, coupled to the address calculation module, for generating a comparison between a destination address of the destination and the user generated address; a route generation module, coupled to the address comparison module, for generating a travel route to the user generated address for the destination with the comparison as a non-match; and a route display module, coupled to the route generation module, for displaying the travel route on a device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
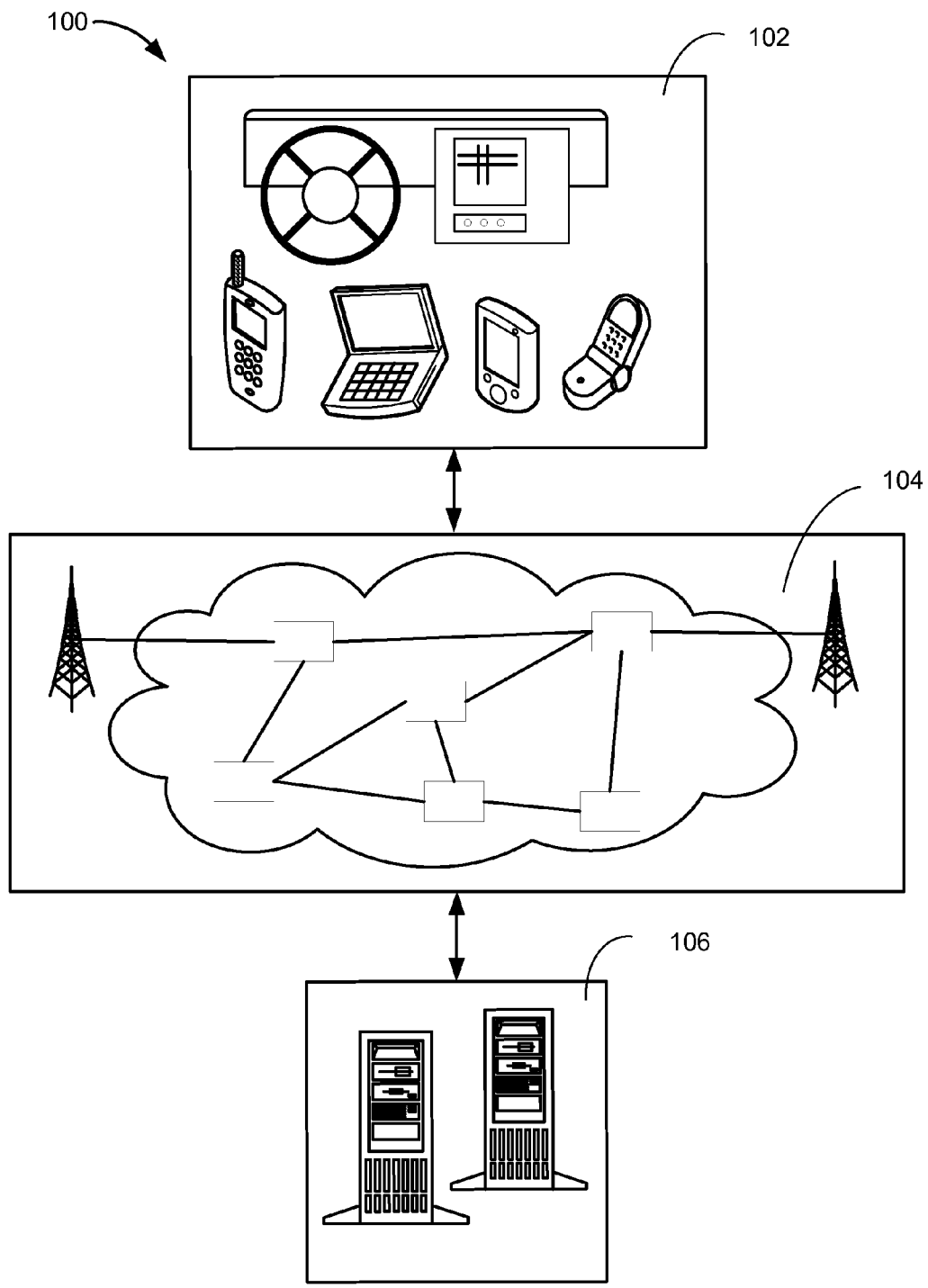
FIG. 1 is a navigation system with location adaptation in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing Figures. Similarly, although the views in the drawings for ease of description generally show similar orientations, this depiction in the Figures is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a navigation system 100 with location adaptation in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
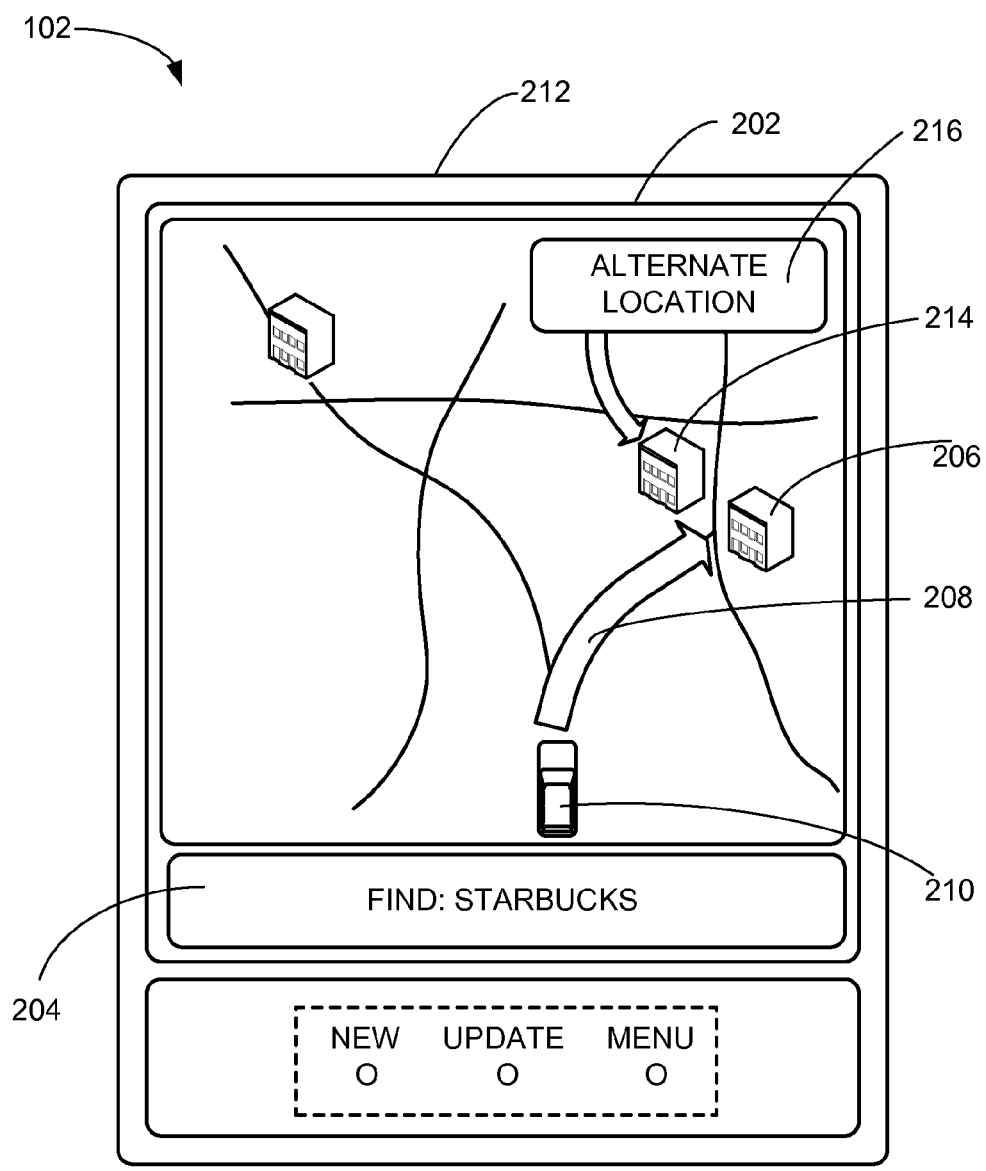
FIG. 2 is an example of a user display interface of the first device.

Referring now to FIG. 2, therein is shown an example of a user display interface 202 of the first device 102. The first device 102 can receive a request 204 for a destination 206. The request 204 is defined as a query received from a user, the navigation system 100, or a combination thereof. For example, the request 204 can be a command entered into the first device 102.

The destination 206 is defined as a location that the user desires to reach. For example, the destination 206 can be a place of business, a school, or a residence. As a further example, the destination can be a non-specified location, such as "the nearest gas station" or "the closest post office," or a specified location with a unique address, such as "1130 Kifer Rd., Sunnyvale, Calif.".

The user display interface 202 can display a travel route 208 on a device 212. The travel route 208 is defined as a path that the user with the navigation system 100 can take to reach the destination 206. The travel route 208 can include a start location 210 and the destination 206. The device 212 can include the first device 102, the second device 106, or a combination thereof.

The start location 210 is defined as the physical location of the first device 102 at the time the first device 102 receives the request 204 for the destination 206. For example, the start location 210 can be the physical location where the user inputs the request 204 into the navigation system 100.

The user display interface 202 can display a user generated location 214. The user generated location 214 is defined as a location identified by one or more previous users as the actual location of the destination 206 having an address that is incorrect, out of date, or in a different physical location.

For illustrative purposes, the user display interface 202 is shown displaying the user generated location 214 however, it is understood that the user display interface 202 can be shown differently. For example, the user display interface 202 can be shown without the user generated location 214. In a further example, the user display interface 202 can be shown with the destination 206 as the user generated location 214.

The user display interface 202 can display a user notification 216. The user notification 216 is defined as a message notifying the user of the user generated location 214. The user notification 216 can be a visual notification, audio notification, or combination thereof.

For illustrative purposes, the navigation system 100 is shown with the user notification 216 is identifying the user generated location 214 however it is understood that the user notification 216 can be shown differently. For example, the user notification 216 can advise the user that the travel route 208 was generated to the user generated location 214 and not to the destination 206.

Figure 3:
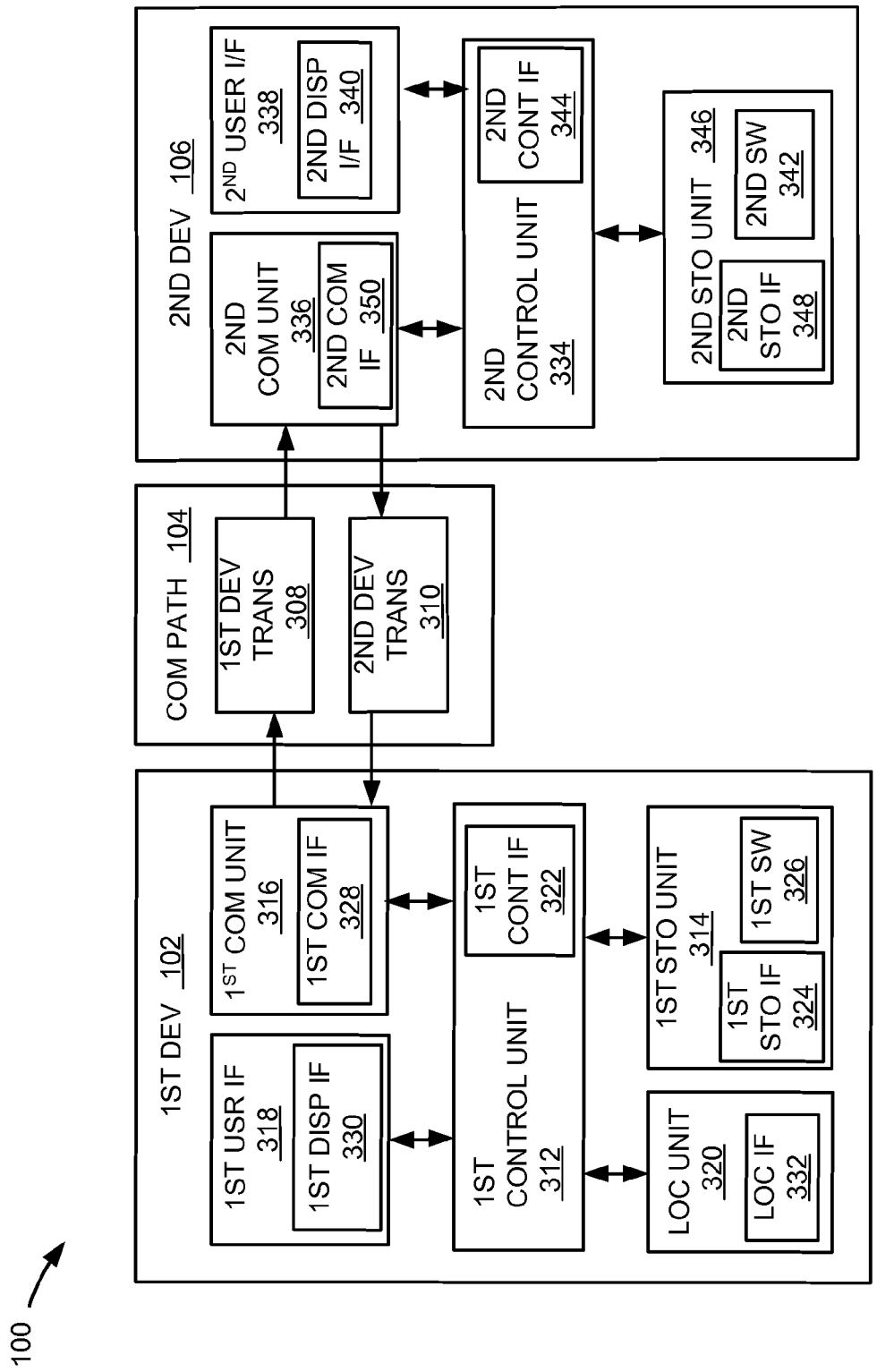
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as nonvolatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first, user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
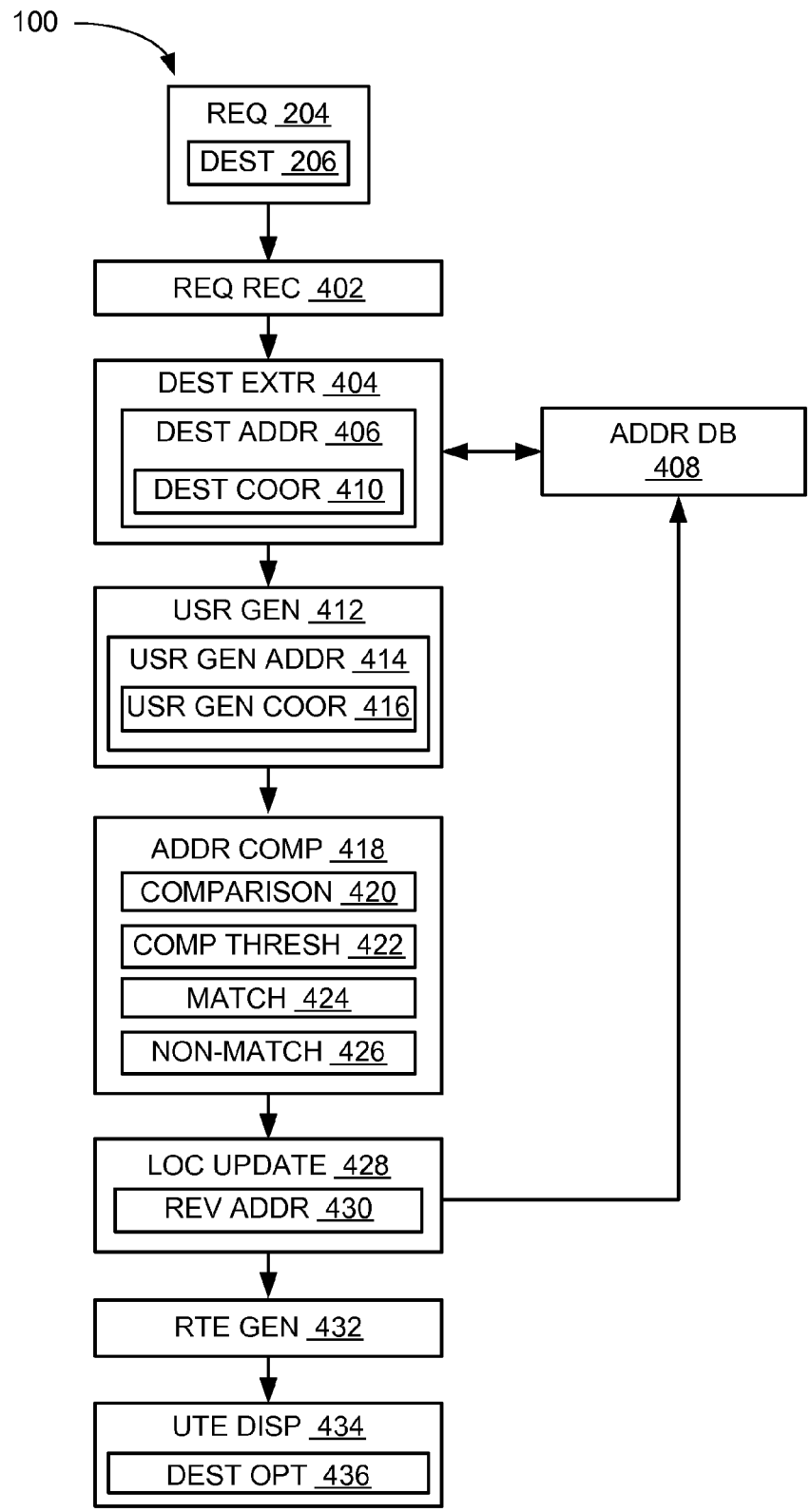
FIG. 4 is a control flow of the navigation system.

Referring now to FIG. 4, therein is shown a control flow of the navigation system 100. The navigation system 100 can include a request receiver module 402. The request receiver module 402 receives requests to generate navigation instructions to a location. The request receiver module 402 can receive the request 204 to generate navigation instructions to the destination 206.

The request receiver module 402 can receive the request 204 in a number of different ways. For example, the request receiver module 402 can receive the request 204 from external sources, such as a user or remote server, or internal sources, such as from onboard memory. In a further example, the user can enter the request 204 by manually typing in, selecting from a list, or speaking a voice command. As another example, the request 204 can be retrieved automatically from a remote server or onboard memory.

The navigation system 100 can include a destination extraction module 404. The destination extraction module 404 extracts an address associated with a location. The destination extraction module 404 can extract a destination address 406 associated with the destination 206. The destination address 406 is defined as an identification for the physical location of the destination 206. For example, the destination address 406 can be an actual address, such as "1130 Kifer Rd., Sunnyvale, Calif.", the longitude and latitude coordinates of the destination 206, or a combination thereof.

The destination address 406 can vary depending on the country. For example, the destination address 406 can include township; province, and district in addition to a numeric designation.

The destination extraction module 404 can extract the destination address 406 in a number of different ways. For example, the destination extraction module 404 can extract the destination address 406 by searching for the physical address of the destination 206. As a further example, the destination extraction module 404 can access an address database 408. The address database 408 can be part of an integrated or onboard storage unit, such as a hard drive or a data disk, or a remote storage unit, such as a data server, that stores the destination address 406.

The destination address 406 can include a destination coordinate 410. The destination coordinate 410 describes the physical position of a location. For example, the destination coordinate 410 can be the longitude and latitude coordinates of the destination address 406 representing the destination address 406. In a further example, the destination coordinate 410 can be a set of coordinates representing the destination address 406 as a two dimensional point in space in a mapping or navigation system. In another example, the destination coordinate 410 can be a set of coordinates representing the destination address 406 as a three dimensional point in space in a mapping or navigation system. As a further example, the destination coordinate 410 can be a combination of the aforementioned examples.

The navigation system 100 can include a user generated address module 412. The user generated address module 412 establishes a search threshold based on the characteristics of a location, retrieves the navigation experiences of previous users traveling to the location, filters those previous user's experiences outside of the established search threshold, and calculates an address based on the previous user's experience filtered by the search threshold. Each of these functions will be discussed in greater detail below.

The user generated address module 412 can calculate a user generated address 414 associated with the destination 206. The user generated address 414 is an address, generated by one or more previous users, for the destination 206 having the destination address 406 that is incorrect, out of date, or in a different physical location. The user generated address 414 can be an identification for the physical location of the user generated location 214 of FIG. 2.

The user generated address 414 can include a user generated coordinate 416. The user generated coordinate 416 describes the physical position of the user generated address 414. For example, the user generated coordinate 416 can be the longitude and latitude coordinates of the user generated address 414. In a further example, the user generated coordinate 416 can be a set of coordinates representing the user generated address 414 as a two dimensional point in space in a mapping or navigation system. In another example, the user generated coordinate 416 can be a set of coordinates representing the user generated address 414 as a three dimensional point in space in a mapping or navigation system. As a further example, the user generated coordinate 416 can be a combination of the aforementioned examples.

The navigation system 100 can include an address comparison module 418. The address comparison module 418 compares an address associated with a location to an address based on previous user experiences associated with the same location. The address comparison module 418 can generate a comparison 420 between the destination address 406 of the destination 206 and the user generated address 414 for the destination 206. The comparison 420 determines if a previous user's position at the end of a navigation experience to a location is within a specified proximity to the address associated with that location.

The address comparison module 418 can generate the comparison 420 in a number of different ways. For example, the address comparison module 418 can generate the comparison 420 by measuring the difference between the destination coordinate 410 and the user generated coordinate 416 with a comparison threshold 422.

The comparison threshold 422 is a distance threshold or outer limit to determine if a location is within a specified distance or area of another location. The comparison threshold 422 can be a predetermined or variable distance from the destination 206.

For example, the comparison threshold 422 can be a round or circular area around the destination 206. In a more specific example, the destination 206 can be at the center of the of the comparison threshold 422.

In another example, the comparison threshold 422 can be an angular geometric area, such as a square or rectangle, around the destination 206. In a more specific example, the destination 206 can be in a non-central location within the comparison threshold 422, such as in or near a corner of the comparison threshold 422, or near or along a perimeter of the comparison threshold 422.

The comparison threshold 422 can vary depending on a number of factors. For example, the comparison threshold 422 can be larger for rural areas or residential locations and smaller for urban areas or crowded locations.

The comparison 420 can indicate a match 424 when the difference between the destination coordinate 410 and the user generated coordinate 416 is within the comparison threshold 422. The comparison 420 can indicate a non-match 426 when the difference between the destination coordinate 410 and the user generated coordinate 416 is outside the comparison threshold 422.

The navigation system 100 can include a location update module 428. The location update module 428 updates a stored address associated with a location. The location update module 428 can substitute the user generated address 414 for the destination address 406 when the comparison 420 indicates the non-match 426.

The location update module 428 substitute the user generated address 414 for the destination address 406 in a number of different ways. For example, the location update module 428 can update the address database 408 by replacing the destination address 406 with the user generated address 414.

In another example, the location update module 428 can generate a revised address 430 to the destination address 406 in the address database 408 when the comparison indicates the non-match 426. The revised address 430 can be a secondary or alternative address associated with the destination 206 that is stored within the address database 408.

The navigation system 100 can include a route generation module 432. The route generation module 432 generates a route from a starting location to a destination. The route generation module 432 can generate the travel route 208 of FIG. 2 from the start location 210 of FIG. 2 to the destination 206.

The route generation module 432 can generate the travel route 208 in a number of different ways. For example, the route generation module 432 can generate the travel route 208 from the start location 210 of FIG. 2 to the user generated address 414 for the destination 206 when the comparison 420 indicates the non-match 426. In another example, the route generation module 432 can generate the travel route 208 from the start location 210 to the destination address 406 when the comparison 420 indicates the match 424.

The navigation system 100 can include a route display module 434. The route display module 434 can display a travel path or navigation instruction between two locations on a visual interface. The route display module 434 can display the travel route 208 on the user display interface 202 of FIG. 2.

The route display module 434 can display the travel route 208 in a number of different ways. For example, the route display module 434 can display the travel route 208 with the user notification 216 of FIG. 2. As a further example, the route display module 434 can display the travel route 208 with the user generated location 214, the destination 206, or a combination thereof.

As another example, the route display module 434 can include a destination option 436. The destination option 436 can be a notification that allows the user to choose the travel route 208 to the destination 206 or the travel route 208 to the user generated location 214.

The navigation system 100 can be implemented on the first device 102 of FIG. 3, on the second device 106 of FIG. 3, or partitioned between the first device 102 and the second device 106. The first software 326 of FIG. 3 of the first device 102 can include the navigation system 100. For example, the first software 326 can include the request receiver module 402, the destination extraction module 404, the user generated address module 412, the address comparison module 418, the location update module 428, the route generation module 432, and the route display module 434. The first control unit 312 of FIG. 3 can execute the first software 326.

The first control unit 312 can execute the request receiver module 402, the destination extraction module 404, the user generated address module 412, the address comparison module 418, the location update module 428, the route generation module 432, and the route display module 434. The first control unit 312 can execute the request receiver module 402 to receive the request 204 for the destination 206. The request receiver module 402 can receive the request 204 with the first user interface 318.

The first control unit 312 can execute the destination extraction module 404 to extract the destination address 406 the address database 408. The address database 408 can be stored in the first storage unit 314 of FIG. 3.

The first control unit 312 can execute the user generated address module 412 to calculate the user generated address. The first control unit 312 can execute the address comparison module 418 to generate the comparison 420 between the user generated address 414 and the destination address 406.

The first control unit 312 can execute the route generation module 432 to generate the travel route 208. The first control unit 312 can execute the route display module 434 to display the travel route 208 on the first display interface 330 of FIG. 3.

In an example for the second device 106 of FIG. 3, the second software 342 of FIG. 3 can include the navigation system 100. For example, the second software 342 can include the request receiver module 402, the destination extraction module 404, the user generated address module 412, the address comparison module 418, the location update module 428, the route generation module 432, and the route display module 434. The second control unit 334 of FIG. 3 can execute the second software 342.

The second control unit 334 can execute the request receiver module 402, the destination extraction module 404, the user generated address module 412, the address comparison module 418, the location update module 428, the route generation module 432, and the route display module 434. The second control unit 334 can execute the request receiver module 402 to receive the request 204 for the destination 206. The request receiver module 402 can receive the request 204 with the second user interface 338.

The second control unit 334 can execute the destination extraction module 404 to extract the destination address 406 the address database 408. The address database 408 can be stored in the second storage unit 346 of FIG. 3.

The second control unit 334 can execute the user generated address module 412 to calculate the user generated address. The second control unit 334 can execute the address comparison module 418 to generate the comparison 420 between the user generated address 414 and the destination address 406.

The first control unit 312 can execute the route generation module 432 to generate the travel route 208. The first control unit 312 can execute the route display module 434 to display the travel route 208 on the second display interface 340 of FIG. 3.

In another example, the navigation system 100 can be partitioned between the first software 326 and the second software 342. For example, the first software 326 can include the request receiver module 402, the route generation module 432, and the route display module 434. The second software 342 can include the destination extraction module 404 and the user generated address module 412. The second control unit 334 can execute modules partitioned on the second software 342 and the first control unit 312 can execute modules partitioned on the first software 326.

The first control unit 312 can execute the request receiver module 402 to receive the request 204 for the destination 206. The first communication unit 316 can transmit the request 204 to the second device 106. The second communication unit 336 of FIG. 3 can receive the request 204.

The second control unit 334 can execute the destination extraction module 404 to extract the destination address 406 from the address database 408. The address database 408 can be stored on the second storage unit 346.

The second control unit 334 can execute the user generated address module 412 to calculate the user generated address 414. The second communication unit 336 can transmit the user generated address 414 to the first device 102. The first communication unit 316 can receive the user generated address 414.

The first control unit 312 can execute the route generation module 432 to generate the travel route 208. The first control unit 312 can execute the route display module 434 to display the travel route 208 on the first display interface 330.

The navigation system 100 describes the module functions or order as an example. The modules can be partitioned differently. For example, the first software 326 can include the destination extraction module 404 and the address database 408 can be stored in the first storage unit 314. Each of the modules can operate individually and independently of the other modules.

Furthermore, data generated in one module can be used by another module without being directly coupled to each other. For example, the route generation module 432 can receive the destination address 406 from the destination extraction module 404.

Figure 5:
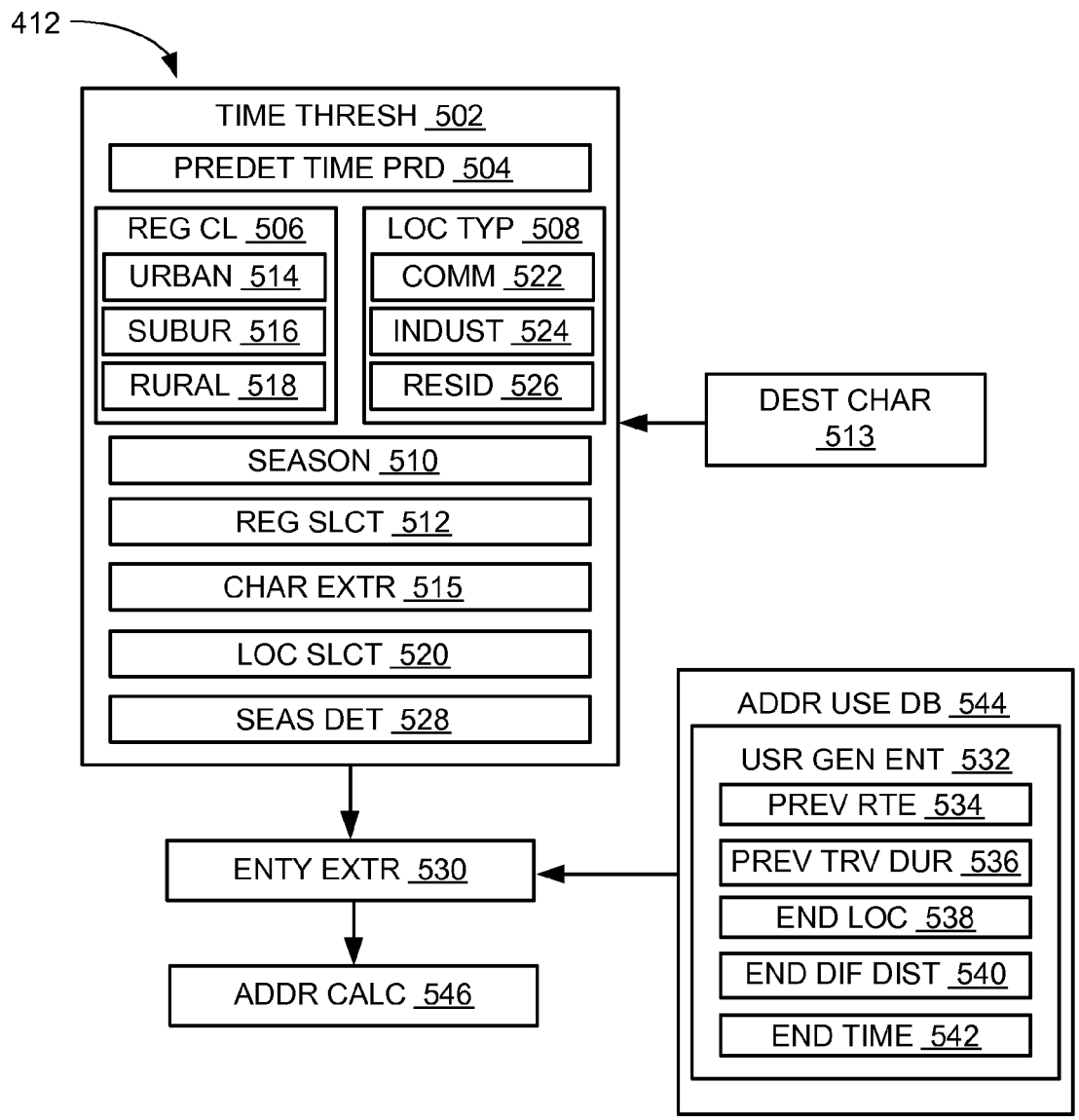
FIG. 5 is a detailed view of the user generated address module of FIG. 4.

Referring now to FIG. 5, therein is shown a detailed view of the user generated address module 412 of FIG. 4. The user generated address module 412 can include a time threshold module 502. The time threshold module 502 establishes a search threshold based on the characteristics of a location. The time threshold module 502 can establish a predetermined time period 504 based on the destination 206. The predetermined time period 504 is a time period threshold to provide reasonable accurate information taking into account the characteristics of the destination 206.

The predetermined time period 504 can be established in a number of different ways. For example, the predetermined time period 504 can be established based on a region classification 506 of the destination 206, a location type 508 of the destination 206, a season 510, or a combination thereof.

The region classification 506 is a classification that describes the population density in the region surrounding the destination 206. The predetermined time period 504 can be shorter for the region classification 506 associated with a higher population density because the higher population density can correlate to a larger number of users navigating to the destination 206 in a given period of time. Thus, a shorter period of time can be used to establish an adequate number of users traveling to the destination 206 for reliable calculation of the user generated address 414. Similarly, the predetermined time period 504 can be longer for the region classification 506 associated with a lower population density.

The location type 508 describes the zoning classification of the destination 206. The predetermined time period 504 can be shorter for the location type 508 that receives a higher volume of travelers. Thus, a shorter period of time can be used to establish an adequate number of users traveling to the destination 206 for reliable calculation of the user generated address 414. Similarly, the predetermined time period 504 can be longer for the location type 508 that receives a lower volume of travelers.

The season 510 is defined as one of the four periods in the year. For example, the season 510 can be spring, summer, autumn or winter.

The time threshold module 502 can include a region selection module 512. The region selection module 512 selects a population classification for the location based on the population density of the area around the location. The region selection module 512 can select the region classification 506 based on a destination characteristic 513 associated with the destination 206.

The destination characteristic 513 is information related to the nature, features, and characteristics of the location. For example, the destination characteristic 513 can describe the population density of the area surrounding the destination 206. As a further example, the destination characteristic 513 can describe the purpose of the destination 206, such as whether the destination 206 is a place of business or a person's home.

The time threshold module 502 can include a characteristic extraction module 515. The characteristic extraction module 515 extracts information related to the location. The characteristic extraction module 515 can extract the destination characteristic 513.

The characteristic extraction module 515 can extract the destination characteristic 513 in a number of different ways. For example, the characteristic extraction module 515 can extract the destination characteristic 513 from a database, such as the address database 408 of FIG. 4.

The region selection module 512 can select the region classification 506 based on the destination characteristic 513 in a number of different ways. For example, the region classification 506 can be selected as an urban area 514, a suburban area 516, or a rural area 518.

The urban area 514 is defined as an area having a high population density. For example, the urban area 514 can be a city. As a further example, the population density can be a measure of people per unit area, such as the number of people living in a square mile or a square kilometer. The measure for the high population density can vary depending on the country.

The suburban area 516 is defined as an area having a moderate population density. For example, the suburban area 516 can be a town, a village, or a populated area outside or surrounding a city. As a further example, the population density can be a measure of people per unit area, such as the number of people living in a square mile or a square kilometer. The measure for the moderate population density can vary depending on the country.

The rural area 518 is defined as an area having a low population density. For example, the rural area 518 can be a country side, an agricultural land, or a forest. As a further example, the rural area 518 can be any other area that is not the urban area 514 or the suburban area 516. As another example, the population density can be a measure of people per unit area, such as the number of people living in a square mile or a square kilometer. The measure for the low population density can vary depending on the country.

The region selection module 512 can select the region classification 506 as the urban area 514. The region classification 506 selected as the urban area 514 can establish the predetermined time period 504 as a short time period, such as a few days to a few weeks.

The region selection module 512 can select the region classification 506 as the suburban area 516. The region classification 506 selected as the suburban area 516 can establish the predetermined time period 504 as a moderate time period, such as a few weeks to a few months.

The region selection module 512 can select the region classification 506 as the rural area 518. The region classification 506 selected as the rural area 518 can establish the predetermined time period 504 as a long time period, such as a few months to a year or longer.

The time threshold module 502 can include a location selection module 520. The location selection module 520 selects a zoning classification for the location based on the destination 206.

The zoning classification can be a measure of the volume of people traveling to the location. The destination characteristic 513 can include the zoning classification. The location selection module 520 can select the location type 508 based on the destination characteristic 513.

The location selection module 520 can select the location type 508 in a number of different ways. For example, the location type 508 can be selected as a commercial location 522, an industrial location 524, or a residential location 526 based on the destination characteristic 513.

The commercial location 522 is defined as a retail location or a location where business is primarily conducted, such as an office building, a store, a shopping center, or a hotel. The commercial location 522 can receive a high volume of travelers.

The industrial location 524 is defined primarily as a location related to manufacturing, such as a manufacturing plant, a factory, a storage facility, or a waste dump. The industrial location 524 can receive a moderate volume of travelers.

The residential location 526 can be a location where people live, such as a home, an apartment, a trailer park, or a condominium. The residential location 526 can receive a low volume of travelers beyond the residence residing in those locations.

The location selection module 520 can select the location type 508 as the commercial location 522. The location type 508 selected as the commercial location 522 can establish the predetermined time period 504 as a short time period, such as a few hours to a few weeks.

The location selection module 520 can select the location type 508 as the industrial location 524. The location type 508 selected as the industrial location 524 can establish the predetermined time period 504 as a moderate time period, such as a few days to a few months.

The location selection module 520 can select the location type 508 as the residential location 526. The location type 508 selected as the residential location 526 can establish the predetermined time period 504 as a long time period, such as a few weeks to a year or more.

The time threshold module 502 can establish the predetermined time period 504 based on a combination of the region classification 506 and the location type 508 to shorten the predetermined time period 504. For example, the predetermined time period 504 based on the destination 206 that receives a high volume of travelers and is in a high population density area can require a shorter period of time to establish a reliable representation for the user generated location 214 compared population density or volume alone. As a specific example, the destination 206 can be a department store or a popular restaurant in a downtown area of a city that can be traveled to by hundreds or thousands of people in a single day. Thus, for the destination 206 having the region classification 506 selected as the urban area 514 and the location type 508 as the commercial location 522, the time threshold module 502 can establish the predetermined time period 504 as a few hours to a few days.

The time threshold module 502 can establish the predetermined time period 504 based on a combination of the region classification 506 and the location type 508 to extend the predetermined time period 504. For example, the predetermined time period 504 based on the destination 206 that receives a low volume of travelers and is in a low population density area can require a longer period of time to establish a reliable representation for the user generated location 214 compared population density or volume alone. As a specific example, the destination 206 can be isolated residence that can be traveled to once every few years, such as a farm house in a country side or a cabin in a forest. Thus, for the destination 206 having the region classification 506 selected as the rural area 518 and the location type 508 as the residential location 526, the time threshold module 502 can establish the predetermined time period 504 as greater than one year.

The time threshold module 502 can establish the predetermined time period 504 where the location type 508 can override the region classification 506. For example, the predetermined time period 504 based on the destination 206 that receives a low volume of travelers can be overridden if the destination 206 is in a high population density area. As a specific example, the destination 206 can be a residential location in the downtown area of a city, such as a high occupancy apartment complex that can receive many visitors in addition to residents. Thus, for the destination 206 having the region classification 506 selected as the urban area 514 and the location type 508 selected as the residential location 526, the predetermined time period 504 can be established as a few weeks to a few months.

The time threshold module 502 can establish the predetermined time period 504 where the region classification 506 can override the location type 508. For example, the predetermined time period 504 based on the destination 206 in a low population density area can be overridden if the destination 206 receives a high volume of travelers. As a specific example, the destination 206 can be a gas station or convenience store along a major highway in an isolated area, such as the country side or in the mountains. Thus, for the destination 206 having the region classification 506 selected as the rural area 518 and the location type 508 selected as the commercial location 522, the predetermined time period 504 can be established as a few days to a few weeks.

The time threshold module 502 can include a season determination module 528. The season determination module 528 can determine the season 510 or time of year at the time a search threshold is established. The season determination module 528 can determine the season 510 associated with the predetermined time period 504 when the time threshold module 502 establishes the predetermined time period 504. For example, if the time threshold module 502 establishes the predetermined time period 504 in the month of December, the season determination module 528 can determine the season as winter if the user is in the northern hemisphere.

The season determination module 528 can determine the season 510 in a number of different ways. For example, the season determination module 528 can determine the season 510 by checking a calendar when the time threshold module 502 establishes the predetermined time period 504.

The time threshold module 502 can adjust the predetermined time period 504 based on the region classification 506, the location type 508, or a combination thereof, for the season 510. For example, the predetermined time period 504 that is already established can be lengthen or shorten by the time threshold module 502 based on the season 510 that is associated with higher or lower frequency of travelers to the destination 206.

In a specific example, the first device 102 can receive the request 204 for the destination 206 as a ski resort in the Sierra Nevada Mountains, such as "Heavenly Ski Resort." The region selection module 512 can select the region classification 506 as the rural area, the location selection module 520 can select the location type 508 as the commercial location 522, and the time threshold module 502 can establish the predetermined time period 504 as a few months to a year. If the first device 102 receives the request 204 in the month of December, the season determination module 528 can select the season 510 as winter and the time threshold module 502 can establish the predetermined time period 504 as a few days to a few weeks. The time threshold module 502 can lengthen the predetermined time period 504 because the winter is the period of time that ski lodges receives a high volume of travelers.

The user generated address module 412 can include an entry extraction module 530. The entry extraction module 530 extracts information related to previous user's navigation experiences traveling to a location with a time filter. The entry extraction module 530 can extract user generated entries 532 associated with the destination 206 and created within the predetermined time period 504.

The user generated entries 532 are previous user's records of navigation experiences generated when traveling to the destination 206. Each of the user generated entries 532 can include a previous route 534, a previous travel duration 536, an end location 538, an end differential distance 540, and an end time 542.

The previous route 534 is defined as the travel route to the destination 206 associated with the previous user's navigation experience. The previous travel duration 536 is defined as the duration or time spent on the previous route 534 by the previous user traveling to the destination 206.

The end location 538 is the physical location of the previous user upon arrival to the destination 206. For example, the end location 538 can be the longitude and latitude coordinates, a set of coordinates representing a two dimensional point in space in a mapping or navigation system, a set of coordinates representing a three dimensional point in space in a mapping or navigation system, or a combination thereof. The end time 542 is the time, date, or a combination thereof associated with the previous user's arrival at the end location 538.

The end differential distance 540 is a measurement of the distance between the end location 538 and the destination coordinate 410 of the destination 206. For example, the end differential distance 540 can be measured distance and direction, such as "five feet to the north west" or "two meters to the south." In another example, the end differential distance 540 can be a set of two dimensional coordinates representing the offset from the destination 206, such as (5, 4) or (−3, 2), which represent the x and y coordinate offset from the origin (0, 0) which can represent the destination 206.

The entry extraction module 530 can extract the user generated entries 532 created within the predetermined time period 504 in a number of different ways. For example, the entry extraction module 530 can extract the user generated entries 532 by filtering the user generated entries 532 having the end time 542 that is outside the predetermined time period 504. In a further example, the entry extraction module 530 can extract the user generated entries 532 having the end time 542 that falls within the predetermined time period 504.

In another example, the user generated entries 532 can be extracted from an address usage database 544. The address usage database 544 can be a database that can store the user generated entries 532. The address usage database 544 can be a part of an integrated or onboard storage unit, such as a hard drive or a data disk, or a remote storage unit, such as a data server, that can store the user generated entries 532.

The address usage database 544 can receive the user generated entries 532 as they are generated by users. For example, the navigation system of the previous user can record and store information associated with the previous user's navigation experience traveling to the destination 206. This information can include the user generated entries 532. The information can then be transmitted to and stored in the address usage database 544.

The user generated address module 412 can include an address calculation module 546. The address calculation module 546 calculates an address associated with a location based on information associated with the previous user's navigation experience traveling to the location. The address calculation module 546 can calculate the user generated address 414 associated with the destination 206 and filtered with the predetermined time period 504. For example, the address calculation module 546 can calculate the user generated address 414 from the user generated entries 532 filtered with the predetermined time period 504 and extracted by the entry extraction module 530.

The address calculation module 546 can calculate the user generated address 414 associated with the destination 206 and filtered with the predetermined time period 504 in a number of different ways. For example, the address calculation module 546 can calculate the user generated address 414 by averaging of each of the end location 538 associated with the user generated entries 532.

An average is a representation of a typical value of a set of numbers, computed as the sum of all the numbers in the set divided by the total numbers in the set. For a set of "n" numbers $\{x1, x2, \ldots, xn\}$, this can be represented by equation 1:

$$\bar{x} = \frac{1}{n}\sum_{i=1}^{n} x_i \qquad (1)$$

For a set of two dimensional (x, y) coordinates used to represent the end location 538 of the user generated entries 532, the address calculation module 546 can calculate the user generated address 414 by calculating an average value for the x-coordinate and an average value for the y-coordinate. For example, the end location 538 of one of the user generated entries is represented by (5, 6), the end location 538 of a second of the user generated entries 532 is represented by (4, 5), and the end location 538 of a third of the user generated entries 532 is represented by (6, 7). The address calculation module 546 can generate the user generated address 414 by averaging the x-coordinate and the y-coordinate. In this example, the user generated address 414 would be (5, 6).

For illustrative purposes, the navigation system 100 is shown with the address calculation module 546 calculating the user generated address 414 based on three of the user generated entries 532, although it is understood that the navigation system 100 can operate the address calculation module 546 to calculate the user generated address 414 differently. For example, the address calculation module 546 can calculate the user generated address 414 based on two of the user generated entries or more than three of the user generated entries 532.

In another example, the address calculation module 546 can calculate the user generated address 414 based on a weighted average of the end location 538, the end time 542, or a combination thereof of the user generated entries 532. A weighted average is an average in which each quantity to be averaged is assigned a weight where the weightings are the equivalent of having multiples of a particular quantity involved in the average calculation.

For a set of "n" numbers $\{x1, x2, \ldots, xn\}$ and corresponding weights $\{w1, w2, \ldots, wn\}$, this can be represented by equation 2:

$$\bar{x} = \frac{\sum_{i=1}^{n} w_i x_i}{\sum_{i=1}^{n} w_i} \qquad (2)$$

For a set of two dimensional (x, y) coordinates used to represent the end location 538 of the user generated entries 532, the address calculation module 546 can calculate the user generated address 414 by calculating an average value for the x-coordinate and an average value for the y-coordinate. In addition, the address calculation module 546 can increases or decreases the weight of the end location 538 associated with one or more of the user generated entries 532 based on the end differential distance 540 associated with the user generated entries 532, the end time 542 associated with the user generated entries 532, or a combination thereof.

For example, the address calculation module 546 can increase the weight of one or more of the user generated entries 532 based the end time 542. The address calculation module 546 can order the user generated entries 532 chronologically within the predetermined time period 504 with one of the user generated entries having the end time 542 closest to the beginning of the predetermined time period 504 having a higher weight than one of the user generated entries having the end time 542 closest to the end of the predetermined time period 504.

As a further example, the address calculation module 546 can decrease the weight of one or more of the user generated entries 532 based on the end differential distance 540. The address calculation module 546 can order the user generated entries 532 by relative distance of the end location 538 of each of the user generated entries 532 from the destination 206 as measured by the end differential distance 540. Lower values of the end differential distance 540 corresponding to one of the user generated entries 532 can have a higher weight than one of the user generated entries 532 having a higher measure of the end differential distance 540.

The address calculation module 546 can calculate the user generated address 414 based on the weighted average of the end time 542, the end location 538, or a combination thereof in a number of different ways. For example, the address calculation module can calculate the weight of the user generated entries 532 with a mathematical regression function, such as linear function or an exponential decay curve.

In yet a further example, the address calculation module 546 can determine if the there is a shift or change in the physical location of the user generated address 414 during the predetermined time period 504. As a specific example, the address calculation module 546 can cluster the user generated entries 532 based on a user generated threshold 548. The user generated threshold 548 is a distance threshold or outer limit to determine if a location is within a specified distance or area of another location.

The user generated threshold 548 can be established in a number of different ways. For example, the user generated threshold 548 can be established as a predetermined value, by an iterative process, or any other method to determine if the user generated address 414 has shifted or moved to a different physical location.

As a specific example, the user generated threshold 548 can be established as a predetermined value based on the location. For instance, if the user generated address 414 is located within a large shopping mall, such as a multi-structured enclosed shopping mall or a shopping center surrounded by numerous parking structures, the end location 538 of many of the previous users can be at various locations near and around the destination 206. Thus, the user generated threshold 548 can be established to be outside the boundary of the shopping mall.

On the other hand, if the user generated address 414 represents a retail or commercial location in a small shopping center, such as a strip mall or a shopping center sharing a single parking area, the end location 538 of the previous users may be concentrated to the parking lot or along the street adjacent to the shopping center where the destination 206 is located. Thus, the user generated threshold 548 can be established as by a set distance, such several yards to a quarter mile or more.

The address calculation module 546 can cluster the user generated entries 532 through various clustering techniques. For example, the address calculation module 546 could utilize techniques such as single pass clustering, hierarchical clustering, or any other clustering techniques known to those with skill in the relevant art.

As a specific example, the address calculation module 546 can utilize single pass clustering technique. For instance, the entry extraction module 530 can extract six of the user generated entries 532 created within the predetermined time period. The address calculation module 546 can begin by creating a first cluster with the end location 538 of one of the user generated entries 532. The first cluster can be selected as the least recent or most recent of the user generated entries 532 or randomly chosen from among the user generated entries 532.

The address calculation module 546 can then compare another of the user generated entries 532 to the first cluster. If the distance between the first cluster and another of the user generated entries 532 is greater than the user generated threshold 548, then a second cluster can be formed with another of the user generated entries 532 or identified as an outlier and not included in calculation of the user generated address 414.

On the other hand, if the distance between the first cluster and another of the user generated entries 532 is less than the user generated threshold 548, then another of the user generated entries 532 can be grouped with the first cluster. Once the first cluster includes another of the user generated entries 532, a first mean of the first cluster, which is the average of the coordinates of the user generated entries 532 in the first cluster, can be calculated.

The remainder of the user generated entries 532 can be compared to the existing clusters and can be merged with an existing cluster or can form a new cluster. For example, the distances between a further one of the user generated entries 532 and each of the existing clusters. The further of one of the user generated entries 532 can be merged with the cluster having the shortest distance or can be formed into a new cluster if any of the distances are greater than the user generated threshold 548.

The address calculation module 546 can determine if the various clusters generated from the user generated entries 532 represent a change or shift in the physical location of the destination 206 through various methods. For example, the address calculation module 546 can compare a cluster distance 550, which is a distance between two groups or clusters of the user generated entries 532, to a difference threshold 552, which is a measure to determine whether a difference between to values is significant enough to identify that two groups are distinct from one another. As a specific example, the difference threshold 552 can be the user generated threshold 548.

In another specific example, the cluster distance 550 can be calculated as the mahalanobis distance or the t-squared distance. Equation 3 represents the equation for the mahalanobis distance, $D_x$, as follows:

$$D_x = \sqrt{(A-B)^T S^{-1}(A-B)} \quad (3)$$

Where A represents the two dimensional average (x, y) of a first cluster of the user generated entries 532 and B is the two dimensional average of a second cluster of the user generated entries 532, T is the transpose of the first parenthetical term, and $S^{-1}$ is the inverse of the common covariance matrix between the first cluster of the user generated entries 532 and the second cluster of the user generated entries 532.

The physical transformation from displaying the travel route 208 to the destination 206 with the destination address 406 that is incorrect or out of date results in movement in the physical world, such as people using the first device 102, the vehicle, or a combination thereof, to travel to the wrong location. People using other means to travel to the correct location of the destination 206 updates the address usage database 544 with corrected information. The correct information from the address usage database 544 is used to calculate the user generated address 414 associated with the destination 206 and filtered with the predetermined time period 504 to improve reliability and ensures that future users reach the destination 206, resulting in movement in the physical world.

The navigation system 100 can be implemented on the first device 102 of FIG. 3, on the second device 106 of FIG. 3, or partitioned between the first device 102 and the second device 106. The first software 326 of FIG. 3 of the first device 102 can include the time threshold module 502, the characteristic extraction module 515, the region selection module 512, the location selection module 520, the season determination module 528, the entry extraction module 530, and the address calculation module 546. The first control unit 312 can execute the first software 326.

The first control unit 312 can execute the time threshold module 502 to establish the predetermined time period 504. The first control unit 312 can execute the characteristic extraction module 515 to extract the destination characteristic 513 from the address database 408. The address database 408 can be stored on the first storage unit 314.

The first control unit 312 can execute the region selection module 512 to select the region classification 506 based on the destination 206. The first control unit 312 can execute the location selection module 520 to select the location type 508 based on the destination 206. The first control unit 312 can execute the season determination module 528 to determine the season 510.

The first control unit 312 can execute the entry extraction module 530 to extract the user generated entries 532 from the address usage database 544. The address usage database 544 can be stored in the first storage unit 314 of FIG. 3. The first control unit 312 can execute the address calculation module 546 to calculate the user generated address 414.

In an example for the second device 106 of FIG. 3, the second software 342 of FIG. 3 can include the navigation system 100. For example, the second software 342 can include the time threshold module 502, the characteristic extraction module 515, the region selection module 512, the location selection module 520, the season determination module 528, the entry extraction module 530, and the address calculation module 546. The second control unit 334 can execute the second software 342.

The second control unit 334 can execute the time threshold module 502 to establish the predetermined time period 504. The second control unit 334 can execute the characteristic extraction module 515 to extract the destination characteristic 513 from the address database 408. The address database 408 can be stored on the second storage unit 346.

The second control unit 334 can execute the region selection module to select the region classification 506 based on the destination 206. The second control unit 334 can execute the location selection module 520 to select the location type 508 based on the destination 206. The second control unit 334 can execute the season determination module 528 to determine the season 510.

The second control unit 334 can execute the entry extraction module 530 to extract the user generated entries 532 from the address usage database 544. The address usage database 544 can be stored in the second storage unit 346 of FIG. 3. The second control unit 334 can execute the address calculation module 546 to calculate the user generated address 414.

In another example, the navigation system 100 can be partitioned between the first software 326 and the second software 342. For example, the first software 326 can include the time threshold module 502, the season determination module 528 and the address calculation module 546. The second software 342 can include the characteristic extraction module 515, the region selection module 512, the location selection module 520, and the entry extraction module 530. The second control unit 334 can execute modules partitioned on the second software 342 and the first control unit 312 can execute modules partitioned on the first software 326.

The first control unit 312 can execute the time threshold module 502 to establish the predetermined time period 504: The first control unit 312 can execute the season determination module 528 to determine the season 510.

The second control unit 334 can execute the characteristic extraction module 515 to extract the destination characteristic 513 from the address database 408. The address database 408 can be stored on the second storage unit 346. The second control unit 334 can execute the region selection module 512 to select the region classification 506. The second control unit 334 can execute the location selection module 520 to select the location type 508.

The second control unit 334 can execute the entry extraction module 530 to extract the user generated entries 532 from the address usage database 544. The address usage database 544 can be stored in the second storage unit 346.

The second communication unit 336 can transmit the user generated entries to the first device 102. The first control unit 312 can execute the address calculation module 546 to calculate the user generated address 414 from the user generated entries 532.

The navigation system 100 describes the module functions or order as an example. The modules can be partitioned differently. For example, the first software 326 can include the region selection module 512 and the location selection module 520. Each of the modules can operate individually and independently of the other modules.

Furthermore, data generated in one module can be used by another module without being directly coupled to each other.

For example, the address calculation module 546 can receive the predetermined time period 504 from the time threshold module 502.

It has been discovered that the present invention provides the navigation system 100 for accurate and more robust navigation to the destination 206. By generating the travel route 208 to the user generated address 414 filtered with the predetermined time period 504, the navigation system 100 avoids generating the travel route 208 to the destination address 406 of the destination 206 that is incorrect or out of date, thereby providing the navigation system 100 that is more accurate, robust, and up to date.

It has also been discovered that the present invention provides the navigation system 100 for an additional level of reliability and accuracy. By filtering the user generated entries 532 with the predetermined time period 504 established based on the region classification 506, the location type 508, and the season 510, the navigation system 100 can calculate the user generated address 414 that is refined by location, region, and season. Thus, generating the travel route 208 to the user generated address 414 provides the navigation system 100 with an additional level of reliability and accuracy.

It has further been discovered that the present invention provides the navigation system 100 for safe operation of the navigation system 100 and the vehicle. By generating the travel route 208 to the user generated address 414 filtered with the predetermined time period 504 prevents distractions associated with arrival at the destination address 406 that is incorrect or out of date or searching for the correct location for the destination 206 from the destination address 406 that is incorrect or out of date destination, thereby increasing safety when operating the navigation system 100 and the vehicle.

Figure 6:
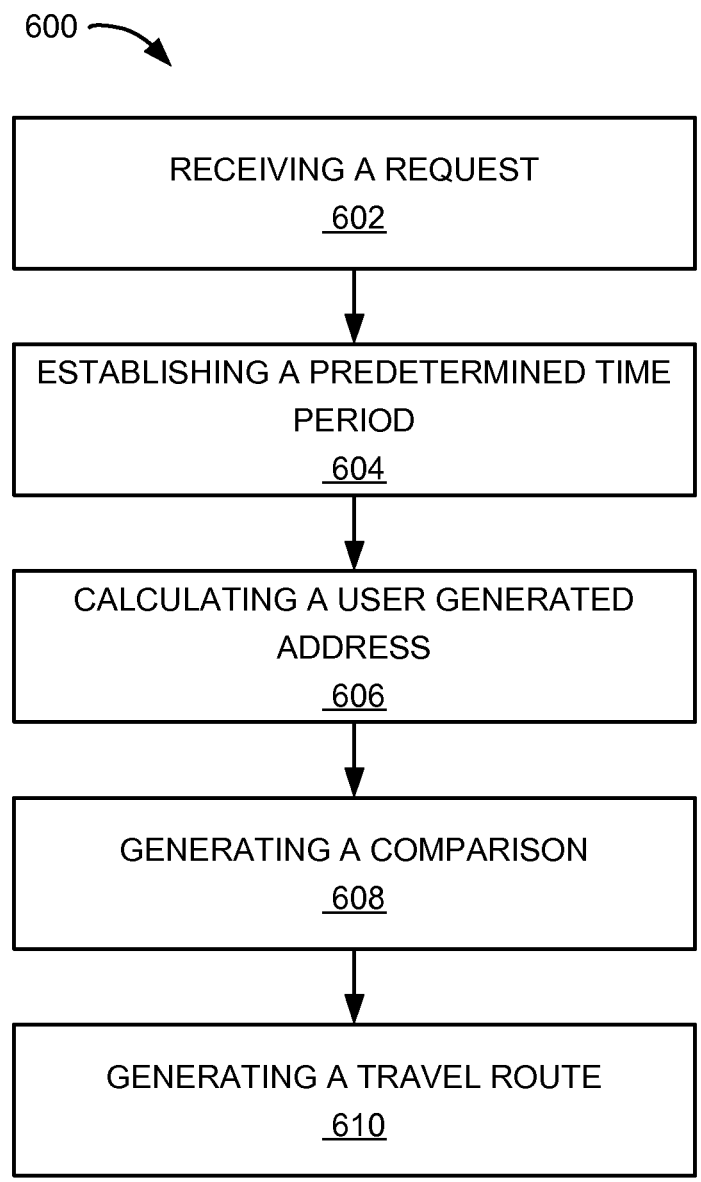
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: receiving a request for a destination in a block 602; establishing a predetermined time period based on the destination in a block 604; calculating a user generated address associated with the destination and filtered with the predetermined time period in a block 606; generating a comparison between a destination address of the destination and the user generated address in a block 608; and generating a travel route to the user generated address for the destination with the comparison as the non-match for displaying on a device in a block 610.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   receiving a request for a destination;
   establishing a predetermined time period based on the destination;
   calculating a user generated address associated with the destination and filtered with the predetermined time period;
   generating a comparison between a destination address of the destination and the user generated address; and
   generating a travel route to the user generated address for the destination with the comparison as the non-match for displaying on a device.

2. The method as claimed in claim 1 wherein establishing the predetermined time period includes establishing the predetermined time period based on a region classification of the destination.

3. The method as claimed in claim 1 wherein establishing the predetermined time period includes establishing the predetermined time period based on a location type of the destination.

4. The method as claimed in claim 1 further comprising:
   extracting user generated entries associated with the destination with the user generated entries each having an end time; and wherein:
   calculating the user generated address includes calculating the user generated address from the user generated entries based on a weighted average of the end time.

5. The method as claimed in claim 1 further comprising:
   extracting user generated entries associated with the destination with the user generated entries each having an end location; and wherein:
   calculating the user generated address includes calculating the user generated address from the user generated entries based on a weighted average of the end location.

6. A method of operation of a navigation system comprising:
   receiving a request for a destination;
   establishing a predetermined time period based on the destination;
   extracting user generated entries associated with the destination and created within the predetermined time period;
   calculating a user generated address from a weighted average of the user generated entries;
   generating a comparison between a destination address of the destination and the user generated address; and
   generating a travel route to the user generated address of the destination with the comparison as the non-match for displaying on a device.

7. The method as claimed in claim 6 wherein:
   establishing the predetermined time period includes establishing the predetermined time period based on a region classification of the destination; and further comprising:
   selecting the region classification as an urban area, a suburban area, or a rural area.

8. The method as claimed in claim 6 wherein:
   establishing the predetermined time period includes establishing the predetermined time period based on a location type of the destination; and further comprising:
   selecting the location type as a commercial location, an industrial location, or as a residential location.

9. The method as claimed in claim 6 wherein:
   establishing the predetermined time period includes determining a season associated with the predetermined time period; and further comprising:
   adjusting the predetermined time period for the season.

10. The method as claimed in claim 6 further comprising generating the travel route to the destination address of the destination with the comparison as a match.

11. A navigation system comprising:
    a request receiver module for receiving a request for a destination;
    a time threshold module, coupled to the request receiver module, for establishing a predetermined time period based on the destination;
    an address calculation module, coupled to the time threshold module, for calculating a user generated address associated with the destination and filtered with the predetermined time period;
    an address comparison module, coupled to the address calculation module, for generating a comparison between a destination address of the destination and the user generated address;
    a route generation module, coupled to the address comparison module, for generating a travel route to the user generated address for the destination with the comparison as a non-match; and
    a route display module, coupled to the route generation module, for displaying the travel route on a device.

12. The system as claimed in claim 11 wherein the time threshold module is for establishing the predetermined time period based on a region classification of the destination.

13. The system as claimed in claim 11 wherein the time threshold module is for establishing the predetermined time period based on a location type of the destination.

14. The system as claimed in claim 11 further comprising:
    a user entry extraction module, coupled to the time threshold module, for extracting user generated entries associated with the destination with the user generated entries each having an end time; and wherein:
    the address calculation module is for calculating the user generated address from the user generated entries based on a weighted average of the end time.

15. The system as claimed in claim 11 further comprising:
    a user entry extraction module, coupled to the time threshold module, for extracting user generated entries associated with the destination with the user generated entries each having an end location; and wherein:
    the address calculation module is for calculating the user generated address from the user generated entries based on a weighted average of the end location.

16. The system as claimed in claim 11 further comprising:
    a user entry extraction module, coupled to the time threshold module, for extracting user generated entries associated with the destination and created within the predetermined time period; and wherein:
    the address calculation module is for calculating the user generated address from the user generated entries.

17. The system as claimed in claim 16 wherein the time threshold module is for establishing the predetermined time period based on a region classification includes a region selection module for selecting the region classification as an urban area, a suburban area, or a rural area.

18. The system as claimed in claim 16 wherein the time threshold module is for establishing the predetermined time period based on a location type includes a location selection module for selecting the location type as an industrial location, a commercial location, or a residential location.

19. The system as claimed in claim 16 wherein the time threshold module is for adjusting the predetermined time period for a season includes a season determination module for determining the season.

20. The system as claimed in claim 16 wherein the route generation module is for generating the travel route to the destination address of the destination with the comparison as a match.

* * * * *